United States Patent
Kawashima

(10) Patent No.: US 12,255,335 B2
(45) Date of Patent: *Mar. 18, 2025

(54) ALL-SOLID-STATE BATTERY

(71) Applicant: TOYOTA JIDOSHA KABUSHIKI KAISHA, Toyota (JP)

(72) Inventor: Shohei Kawashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,829

(22) Filed: Mar. 27, 2024

(65) Prior Publication Data

US 2024/0234737 A1    Jul. 11, 2024

Related U.S. Application Data

(63) Continuation of application No. 17/673,195, filed on Feb. 16, 2022, now Pat. No. 11,984,602.

(30) Foreign Application Priority Data

Mar. 12, 2021    (JP) .................. 2021-040013

(51) Int. Cl.
| | |
|---|---|
| *H01M 4/62* | (2006.01) |
| *H01M 4/38* | (2006.01) |
| *H01M 10/052* | (2010.01) |
| *H01M 4/02* | (2006.01) |

(52) U.S. Cl.
CPC ............. *H01M 4/625* (2013.01); *H01M 4/38* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 11,984,602 B2 * | 5/2024 | Kawashima | .......... H01M 4/625 |
| 2012/0214070 A1 | 8/2012 | Yamamoto et al. | |
| 2018/0351167 A1 | 12/2018 | Tojigamori et al. | |
| 2018/0366725 A1 * | 12/2018 | Chiba | .................. H01M 4/387 |
| 2019/0305368 A1 | 10/2019 | Mizutani et al. | |
| 2022/0293953 A1 | 9/2022 | Kawashima | |

FOREIGN PATENT DOCUMENTS

| | | |
|---|---|---|
| JP | 2008-117761 A | 5/2008 |
| JP | 2016-009679 A | 1/2016 |
| JP | 2018-206537 A | 12/2018 |
| JP | 2019-185897 A | 10/2019 |

OTHER PUBLICATIONS

Non-Final Office Action dated Oct. 5, 2023, Issued to U.S. Appl. No. 17/673,195, filed Feb. 16, 2022.
Notice of Allowance dated Feb. 6, 2024, Issued to U.S. Appl. No. 17/673,195, filed Feb. 16, 2022.

* cited by examiner

*Primary Examiner* — Tanisha Diggs
(74) *Attorney, Agent, or Firm* — Dinsmore & Shohl LLP

(57) ABSTRACT

Provided is an all-solid-state battery capable of suppressing a rise in the resistance increase ratio thereof. The all-solid-state battery includes an anode active material layer containing an alloy-based active material, a first fibrous carbon, and a second fibrous carbon, wherein when a fiber diameter of the first fibrous carbon is defined as A, and a fiber diameter of the second fibrous carbon is defined as B, the ratio of A to B is 10 to 300, and when the proportion (wt %) of the first fibrous carbon to the alloy-based active material is defined as X, and the proportion (wt %) of the second fibrous carbon to the alloy-based active material is defined as Y, the proportion ($\{Y/(X+Y)\}\times100\%$) of the contained second fibrous carbon to a total of the first fibrous carbon and the second fibrous carbon is 0.5% to 10%.

3 Claims, 2 Drawing Sheets

Proportion (%) of second fibrous carbon to total amount of carbon fibers

ALL-SOLID-STATE BATTERY

CROSS-REFERENCE TO RELATED APPLICATIONS

This nonprovisional application is a continuation application of U.S. patent application Ser. No. 17/673,195 filed Feb. 16, 2022, which claims the benefit of priority of the prior Japanese Patent Application No. 2021-040013 filed Mar. 12, 2021, the entire contents of which are incorporated herein by reference.

FIELD

The present application relates to an all-solid-state battery.

BACKGROUND

An all-solid-state battery is provided with a cathode including a cathode active material layer, an anode including an anode active material layer, and a solid electrolyte layer disposed between them and containing a solid electrolyte. Plural sets of such layers are stacked to be sealed in an outer casing.

Patent Literature 1 discloses an all-solid-state battery comprising an anode comprising: a Si-based active material; and a fibrous carbon as a conductive aid. Patent Literature 2 discloses an all-solid-state secondary battery including two carbons as a conductive aid of a cathode which are a spherical carbon having a particle size of 150 nm or less and a fibrous carbon having a fiber length of 10 μm or more; the weight ratio of the fibrous carbon to the spherical carbon is 80/20 to 50/50.

CITATION LIST

Patent Literature

Patent Literature 1: JP 2019-185897 A
Patent Literature 2: JP 2016-9679 A

SUMMARY

Technical Problem

A high resistance increase ratio is a problem with conventional arts. The high resistance increase ratio means that deterioration of the battery is increased after long-term use.

In view of the circumstances of the foregoing, an object of the present application is to provide an all-solid-state battery capable of suppressing the resistance increase ratio thereof.

Solution to Problem

The inventor of the present disclosure imagined that: use of an alloy-based active material for an anode makes it impossible to form two types of paths at the same time, which leads to a high resistance increase ratio. Here, the two types of paths are a broad path to connect cracks appearing due to shrinkage of the active material in discharge and a minute path to cover all the active material particles. The inventor then conceived such an idea that: a spherical carbon forms a short path, and is not suitable to form both types of a broad path and a minute path; and a fibrous carbon can play a role of a broad path and a minute path because of a fiber diameter thereof, but only one fibrous carbon cannot form both types of paths. The inventor embodied this idea to complete the present disclosure.

One aspect of the present disclosure to solve the above problem is an all-solid-state battery comprising: an anode active material layer containing an alloy-based active material, a first fibrous carbon, and a second fibrous carbon, wherein when a fiber diameter of the first fibrous carbon is defined as A, and a fiber diameter of the second fibrous carbon is defined as B, a ratio of A to B is 10 to 300, and when a proportion (wt %) of the first fibrous carbon to the alloy-based active material is defined as X, and a proportion (wt %) of the second fibrous carbon to the alloy-based active material is defined as Y, a proportion ($\{Y/(X+Y)\} \times 100\%$) of the contained second fibrous carbon to a total of the first fibrous carbon and the second fibrous carbon is 0.5% to 10%.

Effects

The all-solid-state battery according to the present disclosure is capable of suppressing a rise in the resistance increase ratio thereof.

DESCRIPTION OF EMBODIMENTS

1 Structure of all-Solid-State Battery

Figure 1:
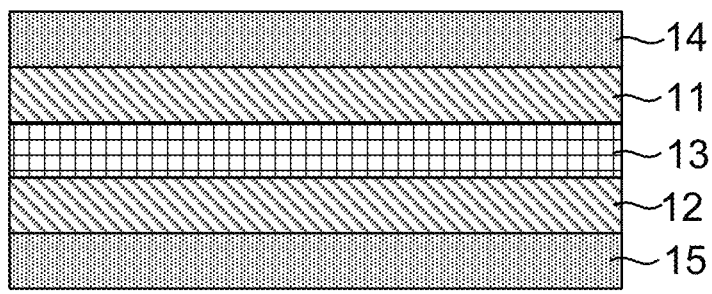
FIG. 1 explanatorily shows a layer structure of an all-solid-state battery 10.

For explaining an all-solid-state battery according to the present disclosure, FIG. 1 shows a layer structure of an all-solid-state battery 10 according to one embodiment. As can be seen from FIG. 1, the all-solid-state battery 10 has a cathode active material layer 11 containing a cathode active material, an anode active material layer 12 containing an anode active material, a solid electrolyte layer 13 formed between the cathode active material layer 11 and the anode active material layer 12, a cathode current collector layer 14 configured to collect current of the cathode active material layer 11, and an anode current collector layer 15 configured to collect current of the anode active material layer 12. The cathode active material layer 11 and the cathode current collector layer 14 may be called together a cathode layer (cathode). The anode active material layer 12 and the anode current collector layer 15 may be called together an anode layer (anode).

Hereinafter each of the components of the all-solid-state battery 10 will be described.

1.1. Cathode Active Material Layer

The cathode active material layer 11 is a layer containing a cathode active material, and may further contain at least one of a solid electrolyte, a conductive aid and a binder if necessary.

Any known active material may be used as the cathode active material. Examples of the cathode active material include cobalt-based (such as $LiCoO_2$), nickel-based (such as $LiNiO_2$), manganese-based (such as $LiMn_2O_4$ and $Li_2Mn_2O_3$), iron phosphate-based (such as $LiFePO_4$ and Li$_2$FeP$_2$O$_7$), NCA-based (such as a compound of nickel, cobalt and aluminum), and NMC-based (such as a compound of nickel, manganese and cobalt) active materials, and a more specific example thereof is LiNi$_{1/3}$Co$_{1/3}$Mn$_{1/3}$O$_2$.

The surface of the cathode active material may be coated with an oxide layer such as a lithium niobate layer, a lithium titanate layer and a lithium phosphate layer.

The particle size of the cathode active material is not particularly limited, but for example, is in some embodiments, in the range of 5 μm and 50 μm. Here, in this description, "particle size" means a particle diameter at a 50% integrated value (D50) in a volume-based particle diameter distribution that is measured using a laser diffraction and scattering method.

For example, 50 wt % to 99 wt % of the cathode active material layer is the cathode active material.

In some embodiments, the solid electrolyte is an inorganic solid electrolyte because the inorganic solid electrolyte has high ionic conductivity and is excellent in heat resistance, compared with the organic polymer electrolyte. Examples of inorganic solid electrolytes include sulfide solid electrolytes and oxide solid electrolytes.

Examples of sulfide solid electrolyte materials having Li-ion conductivity include Li$_2$S—P$_2$S$_5$, Li$_2$S—P$_2$S$_5$—LiI, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$-ZmSn (m and n are positive numbers, and Z is any of Ge, Zn and Ga), Li$_2$S—GeS$_2$, Li$_2$S—SiS$_2$—Li$_3$PO$_4$ and Li$_2$S—SiS$_2$-LixMOy (x and y are positive numbers, and M is any of P, Si, Ge, B, Al, Ga and In). The expression "Li$_2$S—P$_2$S$_5$" means any sulfide solid electrolyte material made with a raw material composition containing Li$_2$S and P$_2$S$_5$. The same is applied to the other expressions.

Examples of oxide solid electrolyte materials having Li-ion conductivity include compounds having a NASICON-like structure. Examples of compounds having a NASICON-like structure include compounds (LAGP) represented by the general formula Li$_{1+x}$Al$_x$Ge$_{2-x}$(PO$_4$)$_3$ (0≤x≤2), and compounds (LATP) represented by the general formula Li$_{1+x}$Al$_x$Ti$_{2-x}$(PO$_4$)$_3$ (0≤x≤2). Other examples of oxide solid electrolyte materials include LiLaTiO (such as Li$_{0.34}$La$_{0.51}$TiO$_3$), LiPON (such as Li$_{2.9}$PO$_{3.3}$N$_{0.46}$) and LiLaZrO (such as Li$_7$La$_3$Zr$_2$O$_{12}$).

The content of the solid electrolyte in the cathode active material layer 11 is not particularly limited. For example, 1 wt % to 50 wt % of the cathode active material layer 11 is the solid electrolyte.

The binder is not particularly limited as long as being chemically and electrically stable. Examples of the binder include fluorine-based binders such as polyvinylidene fluoride (PVDF) and polytetrafluoroethylene (PTFE), rubber-based binders such as styrene-butadiene rubber (SBR), olefinic binders such as polypropylene (PP) and polyethylene (PE), and cellulose-based binders such as carboxymethyl cellulose (CMC).

The content of the binder in the cathode active material layer is not particularly limited. For example, 0.1 wt % to 10 wt % of the cathode active material layer is the binder.

As the conductive aid, a carbon material such as acetylene black (AB), Ketjenblack and carbon fibers, or a metallic material such as nickel, aluminum and stainless steel may be used.

The content of the conductive aid in the cathode active material layer is not particularly limited. For example, 0.1 wt % to 10 wt % of the cathode active material layer is the conductive aid.

In some embodiments, the cathode active material layer 11 is in the form of a sheet from a viewpoint that the all-solid-state battery 10 can be easily formed. In some embodiments, the thickness of the cathode active material layer 11 is, for example, 0.1 μm to 1 mm or 1 μm to 150 μm.

1.2. Anode Active Material Layer

The anode active material layer 12 is a layer containing an anode active material, a first fibrous carbon as a conductive aid, and a second fibrous carbon as a conductive aid; and may contain a binder and a solid electrolyte if necessary. The binder and the solid electrolyte may be considered in the same manner as for the cathode active material layer 11.

In some embodiments, the anode active material layer 12 is in the form of a sheet from a viewpoint that the all-solid-state battery 10 can be easily formed. Specifically, the thickness of the anode active material layer 12 is, in some embodiments, for example, 0.1 μm to 1 mm or 1 μm to 150 μm.

[Anode Active Material]

There is no particular limitation on the anode active material. Examples of the anode active material include Si and Si alloys, metallic lithium, and alloy-based active materials such as lithium alloys.

The particle size of the anode active material is not particularly limited. In some embodiments, the particle size is 0.4 μm to 4.0 μm, which can suppress the resistance increase ratio.

[First Fibrous Carbon]

Examples of the first fibrous carbon include carbon fibers, more specifically carbon nanotubes, carbon nanohorns, vapor grown carbon fibers, carbon fibers by electrospinning, polyacrylonitrile-based carbon fibers, and pitch-based carbon fibers.

In some embodiments, a fiber diameter A of the first fibrous carbon is 50 nm to 300 nm or 100 nm to 200 nm. Here, the fiber diameter can be identified by observation of an image enlarged by a scanning electron microscope.

The content of the first fibrous carbon is represented by X wt % to the anode active material contained in the anode active material layer 12. In some embodiments, this X is 1.00 (wt %) to 20.00 (wt %).

[Second Fibrous Carbon]

Examples of the second fibrous carbon include carbon fibers, more specifically carbon nanotubes, carbon nanohorns, vapor grown carbon fibers, carbon fibers by electrospinning, polyacrylonitrile-based carbon fibers, and pitch-based carbon fibers.

A fiber diameter B of the second fibrous carbon is not particularly limited, but in some embodiments is 1 nm to 10 nm or 1 nm to 5 nm.

The content of the second fibrous carbon is represented by Y wt % to the anode active material contained in the anode active material layer 12. In some embodiments, this Y is 0.05 (wt %) to 0.20 (wt %).

[Relationship Between First Fibrous Carbon and Second Fibrous Carbon]

The proportion ({Y/(X+Y)}×100%) of the second fibrous carbon to the total of the first fibrous carbon and the second fibrous carbon (total amount of the fibrous carbons) is set in 0.5% to 10%, which can suppress the resistance increase ratio as described later.

The ratio of the fiber diameter A (nm) of the first fibrous carbon to the fiber diameter B (nm) of the second fibrous carbon is represented by A/B. In some embodiments, A/B is 10 to 300 ro 50 to 200.

1.3. Solid Electrolyte Layer

The solid electrolyte layer 13 is a layer disposed between the cathode active material layer 11 and the anode active material layer 12, and containing a solid electrolyte. The solid electrolyte layer 13 contains at least a solid electrolyte. The solid electrolyte may be considered in the same manner as the solid electrolyte described for the cathode active material layer 11.

For example, 50 wt % to 99 wt % of the solid electrolyte layer 13 is the solid electrolyte.

The solid electrolyte layer 13 may optionally contain a binder. The binder same as that used for the cathode active material layer 11 may be used. The content of the binder in the solid electrolyte layer is not particularly limited. For example, 0.1 wt % to 10 wt % of the solid electrolyte layer is the binder.

1.4. Current Collector Layers

The current collectors are the cathode current collector layer 14 configured to collect current of the cathode active material layer 11, and the anode current collector layer 15 configured to collect current of the anode active material layer 12. Examples of the material constituting the cathode current collector layer 14 include stainless steel, aluminum, nickel, iron, titanium and carbon. Examples of the material constituting the anode current collector layer 15 include stainless steel, copper, nickel and carbon.

The thicknesses of the cathode current collector layer 14 and the anode current collector layer 15 are not particularly limited, but may be suitably set according to a desired battery performance. For example, the thicknesses are each in the range of 0.1 μm to 1 μm.

1.5. Battery Case

The all-solid-state battery may be provided with a battery case that is not shown. The battery case is a case to house each member. An example of the battery case is a stainless battery case.

2. Method of Manufacturing all-Solid-State Battery

A method of manufacturing an all-solid-state battery is not particularly limited, but may be according to a known method. One example will be described below.

[Preparing Cathode Structure]

The material to constitute the cathode active material layer is mixed and kneaded, and then the resultant slurry cathode composition is obtained. Thereafter a surface of the material to be the cathode current collector layer is coated with the prepared slurry cathode composition to be subjected to drying by heating, to form a layer to be the cathode active material layer thereon. Pressure is applied to the resultant. Then, the resultant cathode structure having a layer to be the cathode current collector layer and the layer to be the cathode active material layer is obtained.

[Preparing Anode Structure]

The material to constitute the anode active material layer is mixed and kneaded, and then the resultant slurry anode composition is obtained. Thereafter a surface of the material to be the anode current collector layer is coated with the prepared slurry anode composition to be subjected to drying by heating, to form a layer to be the anode active material layer thereon. Pressure is applied to the resultant. Then, the resultant anode structure having a layer to be the anode current collector layer and the layer to be the anode active material layer is obtained.

[Preparing Solid Electrolyte Layer Structure]

The material to constitute the solid electrolyte layer is mixed and kneaded, and then the resultant slurry solid electrolyte layer composition is obtained. Thereafter a surface of foil is coated with the prepared slurry solid electrolyte layer composition to be subjected to drying by heating, to form a layer to be the solid electrolyte layer thereon. Then, the resultant solid electrolyte layer structure having the foil and a layer to be the solid electrolyte layer is obtained.

[Combining Each Structure]

The layer to be the solid electrolyte layer in the solid electrolyte layer structure and the layer to be the cathode active material layer in the cathode structure are laminated, and the foil in the solid electrolyte structure is removed. Then, the layer to be the solid electrolyte is transferred on the cathode structure.

The layer to be the anode active material layer in the anode structure is further stacked onto the transferred layer to be the solid electrolyte. Then the resultant all-solid-state battery is obtained.

3. Effect Etc

The all-solid-state battery according to the present disclosure is capable of keeping the resistance increase ratio thereof low, and suppressing deterioration of a cell stack after long-term use. This is considered to be because the roles of the fibrous carbon (second fibrous carbon) having a smaller fiber diameter and the fibrous carbon (first fibrous carbon) having a larger fiber diameter, which are contained in the anode active material layer, are divided in such a way that the former secures a minute network in contact with all the anode active material, and the latter secures a role of making a broad network of the anode current collector and the electrode in the depth direction, which makes it possible to maintain decrease of an electronically isolated active material, and improvement of the output performance.

4. Examples

[Preparing Stack]

Stacks for evaluation according to Examples 1 to 11 and Comparative Examples 1 to 7 were prepared as follows.

<Preparing Cathode Layer>

A cathode mixture containing an NCA-based cathode active material ($LiNi_{0.8}Co_{0.15}Al_{0.05}O_2$), a sulfide-based solid electrolyte ($Li_2S$—$P_2S_5$), a vapor grown carbon fiber, a PVdF-based binder, and butyl butyrate as raw materials was stirred by an ultrasonic dispersive device, and then the resultant cathode slurry was prepared. Here, the weight ratio of NCA-based cathode active material:sulfide-based solid electrolyte:vapor grown carbon fiber:PVdF-based binder in the cathode slurry was adjusted to be 88.2:9.8:1.3:0.7. A cathode current collector (Al foil) was coated with this cathode slurry according to a blade method. The resultant was dried on a hot plate at 100° C. for 30 minutes. Then, the resultant cathode layer was obtained.

<Preparing Anode Layer>

An anode mixture containing: a powder Si particle, a sulfide-based solid electrolyte ($Li_2S$—$P_2S_5$), a PVDF-based binder, and butyl butyrate as raw materials; and a carbon material as a conductive aid was stirred by an ultrasonic dispersive device, and the resultant anode slurry was prepared. The carbon material is one or two of fibrous carbons having different fiber diameters of 1 nm to 5000 nm, and a spherical carbon in combination. Tables 1 to 4 specifically show the fiber diameter etc. of the carbon materials.

Here, the weight ratio of powder Si particle:sulfide-based solid electrolyte:carbon material:PVDF-based binder in the anode slurry was adjusted to be 100:95:0.15 to 15.15:4.1. An anode current collector (Ni foil) was coated with this anode slurry according to a blade method. The resultant was dried on a hot plate at 100° C. for 30 minutes. Then, the resultant anode layer was obtained.

<Preparing Solid Electrolyte Layer>

A solid electrolyte mixture containing a sulfide-based solid electrolyte ($Li_2S$—$P_2S_5$), a PVDF-based binder, and butyl butyrate as raw materials was stirred by an ultrasonic dispersive device, and the resultant solid electrolyte slurry was prepared. Here, the weight ratio of sulfide-based solid electrolyte:PVDF-based binder in the solid electrolyte slurry was adjusted to be 99.4:0.4. Al foil was coated with this solid electrolyte slurry according to a blade method. The resultant was dried on a hot plate at 100° C. for 30 minutes, whereby a solid electrolyte layer formed on the Al foil was obtained.

<Preparing Stack>

The prepared cathode layer and solid electrolyte layer (with Al foil) were stacked, so that the faces of the mixtures superposed each other. The resultant was pressed by a roll press at a press pressure of 50 kN/cm at 160° ° C. Thereafter the Al foil on the solid electrolyte layer was removed. From the resultant, a cathode stack having a size of 1 cm$^2$ was stamped out to be obtained.

The prepared anode layer and solid electrolyte layer were stacked, so that the faces of the mixtures superposed each other. The resultant was pressed by a roll press at a press pressure of 50 kN/cm at 160° C. Thereafter the Al foil on the solid electrolyte layer was removed, whereby the resultant anode stack A was obtained. Further, the solid electrolyte layer was further stacked on the anode stack A on the solid electrolyte layer side, so that the faces of the mixtures superposed each other. This resultant stack was temporarily pressed by a planar uniaxial press at a press pressure of 100 MPa at 25° C. Thereafter the Al foil on the solid electrolyte layer was removed. From the resultant, an anode stack B having an additional solid electrolyte and having a size of 1.08 cm$^2$ was stamped out to be obtained.

The prepared cathode stack and anode stack B were stacked, so that the faces of the mixtures superposed each other. This resultant stack was pressed by a planar uniaxial press at a press pressure of 200 MPa at 120° C. Then the resultant stack was obtained.

[Initial Charge Evaluation]

The stack obtained as described above was held between two restraining plates. These two restraining plates were fastened with a fastener at a restraining force of 10 MPa, so that the distance between the two restraining plates was fixed. Next, this restrained stack was subjected to constant current charge at 1/10 C up to 4.05 V, and thereafter to constant voltage charge at 4.05 V up to an end current of 1/100 C. Then, the restraining force when the charge was over was recorded. Further the stack was subjected to constant current discharge at 1/10 C up to 2.5 V, and thereafter to constant voltage discharge at 2.5 V up to an end current of 1/100 C.

[Evaluation of Resistance Increase Ratio]

The charge conditions of the stack after the initial discharge evaluation were adjusted by constant current charge at 1/10 C up to 3.0 V, and thereafter constant voltage charge at 3.0 V up to an end current of 1/100 C. A current of 8.2 mAh/cm$^2$ was passed for 10 seconds through the stack after the charge conditions thereof were adjusted. The difference between the voltages before and after the passage of the current was divided by the current value, from which the resistance was obtained. This resistance was defined as the initial resistance.

The stack after the initial resistance thereof was measured was subjected to a durability test in such a way that charge and discharge was repeated at 300 cycles in the following conditions.

charge conditions for durability: constant current charge at 1 C up to 4.05 V discharge conditions for durability: constant current discharge at 1 C up to 2.5 V The charge conditions of the stack after the durability test were adjusted by constant current charge at 1/10 C up to 3.0 V, and thereafter constant voltage charge at 3.0 V up to an end current of 1/100 C. A current of 8.2 mAh/cm$^2$ was passed for 10 seconds through the stack after the charge conditions thereof were adjusted. The difference between the voltages before and after the passage of the current was divided by the current value, from which the resistance was obtained. This resistance was defined as the resistance after long-term use.

Based on the obtained initial resistance and resistance after long-term use, the resistance increase ratio was calculated from the following formula:

resistance increase ratio (%)=resistance after long-term use (Ω)/initial resistance (Ω)×100

The resistance increase ratios of Examples and Comparative Examples calculated as the above were further converted into relative resistance increase ratios on the basis (100%) of the resistance increase ratio of Example 1, and are shown in Tables 1 to 4. A smaller relative resistance increase ratio represents that deterioration of a cell stack after long-term use was suppressed more.

Table 1

TABLE 1

| | A (nm) | B (nm) | A/B | X (wt %) | Y (wt %) | {Y/(X + Y)} × 100% | Relative resistance increase ratio (%) |
|---|---|---|---|---|---|---|---|
| Example 1 | 300 | 1 | 300 | 1.35 | 0.15 | 10 | 100 |
| Example 2 | 300 | 1 | 300 | 2.85 | 0.15 | 5.0 | 94 |
| Example 3 | 300 | 1 | 300 | 7.35 | 0.15 | 2.0 | 91 |
| Example 4 | 300 | 1 | 300 | 15.00 | 0.15 | 1.0 | 88 |
| Example 5 | 300 | 1 | 300 | 15.00 | 0.07 | 0.5 | 102 |
| Comparative Example 1 | 300 | 1 | 300 | 15.00 | 0.03 | 0.2 | 138 |
| Comparative Example 2 | 300 | 1 | 300 | 0.85 | 0.15 | 15 | 151 |

TABLE 1-continued

|  | A (nm) | B (nm) | A/B | X (wt %) | Y (wt %) | {Y/(X + Y)} × 100% | Relative resistance increase ratio (%) |
|---|---|---|---|---|---|---|---|
| Comparative Example 3 | 300 | 1 | 300 | 0 | 0.15 | 100 | 185 |
| Comparative Example 4 | 300 | 1 | 300 | 7.35 | 0 | 0 | 154 |

A is a fiber diameter (nm) of the first fibrous carbon. B is a fiber diameter (nm) of the second fibrous carbon. X is the amount (wt %) of the added first fibrous carbon to Si (anode active material). Y is the amount (wt %) of the added second fibrous carbon to Si (anode active material).

Table 2

TABLE 2

|  | Particle size of anode active material (μm) | C (nm) | Z (wt %) | Relative resistance increase ratio (%) |
|---|---|---|---|---|
| Comparative Example 5 | 0.4 | 100 | 7.35 | 178 |

Comparative Example 5 was an example where only a spherical carbon was used as a carbon material. In Table 2, C means a particle size (nm) of the spherical carbon. Z is the amount (wt %) of the added spherical carbon to Si (anode active material).

Table 3

TABLE 3

|  | Particle size of anode active material (μm) | A (nm) | B (nm) | A/B | X (wt %) | Y (wt %) | {Y/(X + Y)} × 100% | Relative resistance increase ratio (%) |
|---|---|---|---|---|---|---|---|---|
| Example 3 | 0.4 | 300 | 1 | 300 | 7.35 | 0.15 | 2.0 | 91 |
| Example 6 | 0.4 | 300 | 5 | 60 | 7.35 | 0.15 | 2.0 | 88 |
| Example 7 | 0.4 | 300 | 10 | 30 | 7.35 | 0.15 | 2.0 | 105 |
| Example 8 | 0.4 | 50 | 1 | 50 | 7.35 | 0.15 | 2.0 | 101 |
| Example 9 | 0.4 | 50 | 5 | 10 | 7.35 | 0.15 | 2.0 | 120 |
| Comparative Example 6 | 0.4 | 5000 | 10 | 500 | 7.35 | 0.15 | 2.0 | 252 |
| Comparative Example 7 | 0.4 | 50 | 10 | 5 | 7.35 | 0.15 | 2.0 | 153 |

Table 41

TABLE 4

|  | Particle size of anode active material (μm) | A (nm) | B (nm) | A/B | X (wt %) | Y (wt %) | {Y/(X + Y)} × 100% | Relative resistance increase ratio (%) |
|---|---|---|---|---|---|---|---|---|
| Example 3 | 0.4 | 300 | 1 | 300 | 7.35 | 0.15 | 2.0 | 91 |
| Example 10 | 1 | 300 | 1 | 300 | 7.35 | 0.15 | 2.0 | 96 |
| Example 11 | 4 | 300 | 1 | 300 | 7.35 | 0.15 | 2.0 | 101 |

Results

<Relationship between Ratio of Two Added Fibrous Carbons and Resistance Increase Ratio>

Figure 2:
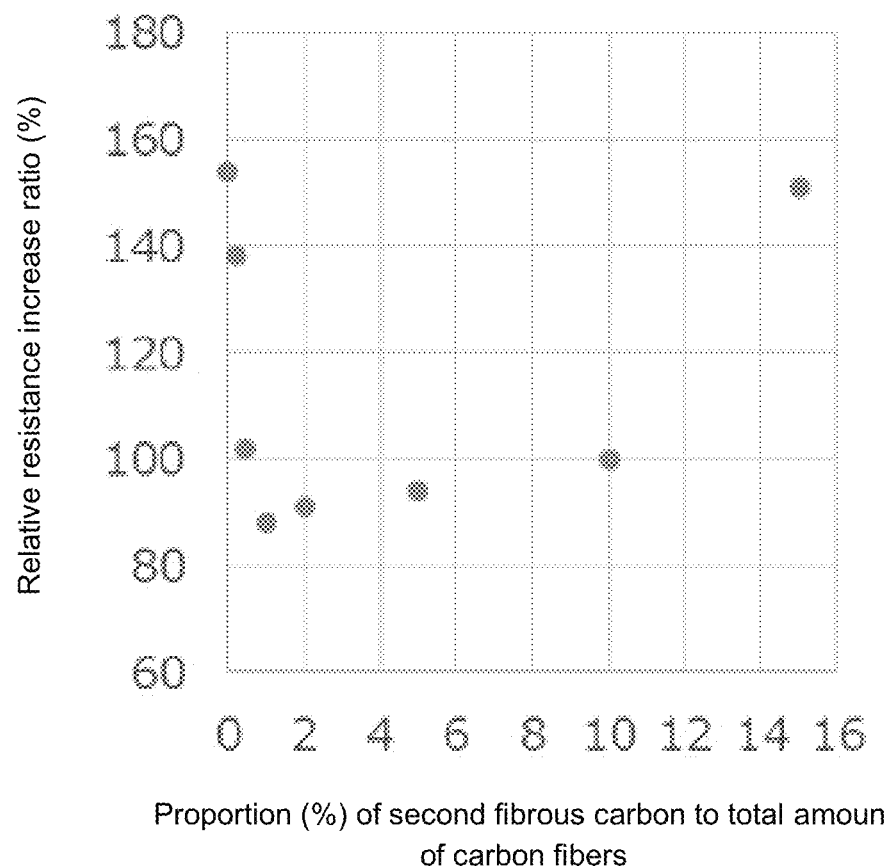
FIG. 2 is a graph where the horizontal axis shows the proportion of the second fibrous carbon to the total amount of the fibrous carbons and the vertical axis shows the relative resistance increase ratio, based on Examples and Comparative Examples.

FIG. 2 shows a graph where the horizontal axis shows the proportion ({Y/(X+Y)}×100%) of the second fibrous carbon to the total amount of the fibrous carbons and the vertical axis shows the relative resistance increase ratio, based on Table 1. FIG. 2, and Examples 1 to 5 and Comparative Examples 1 to 4 in Table 1 prove that when the proportion of the second fibrous carbon to the total amount of the fibrous carbons, that is, {Y/(X+Y)}×100% is 0.5% to 10%, the relative resistance increase ratio decreased, i.e., deterioration of the cell stack after long-term use was suppressed. This shows that the roles of a fibrous carbon (second fibrous carbon) having a smaller fiber diameter and a fibrous carbon (first fibrous carbon) having a larger fiber diameter were divided in such a way that the former secured a minute network in contact with all the anode active material, and the latter secured a role of making a broad network of the anode current collector and the electrode in the depth direction, which made it possible to maintain decrease of an electronically isolated active material, and improvement of the output performance. It is imagined that: when the proportion of the second fibrous carbon was less than 0.5%, any fibrous carbon that could be in contact with the anode active material was insufficient and the first fibrous carbon was excessive, which caused ion paths to be blocked; and when the proportion of the second fibrous carbon was more than 10%, a thick fibrous carbon to connect cracks was insufficient, and thus did not sufficiently bring about the effect.

The resistance increase ratio of Comparative Example 5 shown in Table 2 was a relative resistance increase ratio when only the spherical carbon was used as a carbon material. When only one spherical carbon was used like this, the resistance increase rose, which proves that paths were not properly created in the electrode.

<Relationship Between Ratios of Fiber Diameter of Two Fibrous Carbons and Resistance Increase Ratio>

Examples 3, 6, 7, 8 and 9 and Comparative Examples 6 and 7 in Table 3 prove that when the ratio A/B of the fiber diameter A of the first fibrous carbon to the fiber diameter B of the second fibrous carbon was 10 to 300, the relative resistance increase ratio decreased, that is, deterioration of the cell stack after long-term use was suppressed. This is because the effect of dividing the roles of the fibrous carbons according to the fiber diameter was brought about when A/B was within the range of 10 and 300. It is assumed that: when A/B was less than 10, the fiber diameters of the two were close to each other, so that the roles were not divided and thus the effect was not brought about; and when A/B was more than 300, the number of broad paths lacked because the diameter of the first fibrous carbon was large, which made it impossible to sufficiently cover paths that played a role of bridging cracks in the electrode, so that the effect was not brought about.

<Relationship between Particle Size of Anode Active Material and Resistance Increase Ratio>

Table 4 proves that when the first fibrous carbon having a fiber diameter of 300 nm was added so as to have a proportion of 7.35 wt % to Si (anode active material) and the second fibrous carbon having a fiber diameter of 1 nm was added so as to have a proportion of 0.15 wt % to Si (anode active material), the relative resistance increase ratio decreased even if the particle size (D50) of the anode active material was changed, that is, deterioration of the cell stack after long-term use was suppressed. Among them, in some embodiments, a smaller particle size was used. A particle size less than 4 μm brought about a more outstanding effect thereof.

This is assumed to be because as the particle size of the active material became larger, the tortuosity of ion and electron paths in the electrode decreased more, so that only one fibrous carbon having a larger fiber diameter secured formation of a minute network and formation of paths in the depth direction, and the second fibrous carbon hardly functioned: because of this, a smaller particle size worked more advantageously.

REFERENCE SIGNS LIST 10 all-solid-state battery
11 cathode active material layer
12 anode active material layer
13 solid electrolyte layer
14 cathode current collector layer
15 anode current collector layer

What is claimed is:

1. An all-solid-state battery comprising:
a cathode active material layer,
a sulfide solid electrolyte, and
an anode active material layer containing an alloy-based active material, a first fibrous carbon, and a second fibrous carbon, wherein
when a fiber diameter of the first fibrous carbon is defined as A, and a fiber diameter of the second fibrous carbon is defined as B, a ratio of A to B is 10 to 300, wherein A is from 50 nm to 300 nm and B is from 1 nm to 10 nm, and
when a proportion (wt %) of the first fibrous carbon to the alloy-based active material is defined as X, and a proportion (wt %) of the second fibrous carbon to the alloy-based active material is defined as Y, a proportion ($\{Y/(X+Y)\}\times 100\%$) of the contained second fibrous carbon to a total of the first fibrous carbon and the second fibrous carbon is 0.5% to 10%, the alloy-based anode active material has a particle size of 0.4 μm to 4.0 μm.

2. The all-solid-state battery of claim 1, wherein X is from 1 wt % to 20 wt %.

3. The all-solid state battery of claim 1, wherein Y is from 0.05 wt % to 0.2 wt %.

* * * * *